Dec. 14, 1948.

M. H. AXLER ET AL 2,456,241

METHOD OF MAKING OPTICAL TRANSMISSION
FILTERS BY THERMAL EVAPORATION

Filed Nov. 22, 1946

INVENTORS
Meyer H. Axler
Kenneth F. Tripp
BY
Pennie, Edmonds, Morton and Barrows
ATTORNEYS Dec. 14, 1948.  M. H. AXLER ET AL  2,456,241
METHOD OF MAKING OPTICAL TRANSMISSION
FILTERS BY THERMAL EVAPORATION
Filed Nov. 22, 1946   2 Sheets-Sheet 2
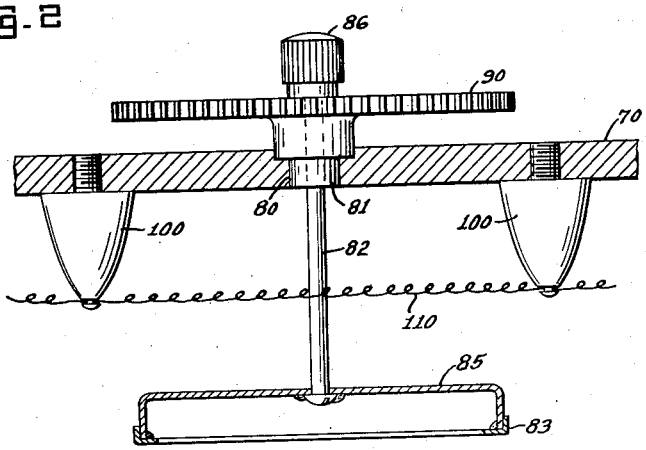
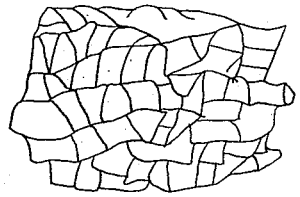
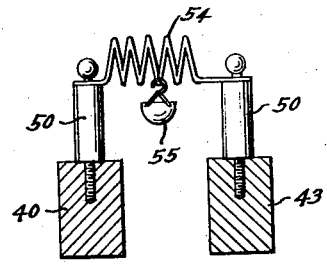
INVENTORS
Meyer H. Axler
Kenneth F. Tripp
BY
Pennie, Edmonds, Morton and Barrows
ATTORNEYS Patented Dec. 14, 1948

2,456,241

UNITED STATES PATENT OFFICE 2,456,241

METHOD OF MAKING OPTICAL TRANSMISSION FILTERS BY THERMAL EVAPORATION

Meyer H. Axler, Corona, and Kenneth F. Tripp, Tuckahoe, N. Y., assignors to Farrand Optical Co., Inc., a corporation of New York Application November 22, 1946, Serial No. 711,562

8 Claims. (Cl. 117—71)

This invention relates to an improved optical filter operating by light ray interference and absorption and to a method and means for the production thereof.

It has been proposed heretofore to construct optical interference filters of alternate layers of metallic and nonmetallic materials, for example as described in German Patent No. 716,153, published January 14, 1942, but it has been found most difficult in practice to produce metallic and nonmetallic layers of the required homogeneity, uniformity and integrity. Accordingly, it is the principal object of the present invention to provide an improved method and means for economically manufacturing interference filters of the type generally described in the said German patent so that such filters may be produced in reasonable quantity with high quality and with predetermined transmission characteristics.

Because the filter layers must be of extreme thinness and because the successive layers are of materials having widely different physical properties, it has been difficult to secure layers of uniform thickness, homogeneous composition and with coplanar surfaces, which would bond together into a permanent and durable structure. In accordance with the invention the layers may be conveniently secured by successive evaporation in a vacuum of metallic and nonmetallic materials in known amounts. Despite the fact that evaporation methods have been known prior to the present invention the problem of depositing successive layers of materials of widely different properties had not been satisfactorily solved.

This problem is basically that of controlling the conditions of deposition according to the nature of the material being deposited so that each layer will possess and retain a uniform thickness and a continuous smooth surface which will be receptive to the next layer to be deposited. Later deposited layers cannot have good characteristics unless the layers on which they are deposited provide a good foundation and support.

We have discovered that the critical factor in the deposition of layers of materials of such widely differing physical properties as metals and nonmetals is the temperature of the surface on which the evaporated material condenses, and that metallic layers are best deposited on cold surfaces while dielectric layers are best deposited on hot surfaces. By controlling the temperatures of the receiving surface in this manner the deposited layer not only acquires the desired characteristics of uniform thickness and freedom from cracks or flakiness, but also presents a smooth noncrystalline surface on which the next layer may be successfully deposited.

One of the principal difficulties hitherto experienced in the manufacture of interference filters has been the occurrence of changes in the characteristics of the filters with age and especially following the application thereto of mechanical protection in the form of a cemented cover plate. The usual interference filter comprises a glass support upon which are successively deposited a first semi-transparent layer of silver or aluminum, an intermediate layer of magnesium fluoride, calcium fluoride or similar dielectric material, and a third layer of silver or aluminum. In order that the filter may be sufficiently rugged to withstand normal use, it is necessary to protect the microscopically thin layers by means of a glass cover plate. The cover plate usually takes the form of a blocking filter which, by absorption, serves to cut off transmission peaks of undesired orders of interference. This cover plate is secured with an optical cement to the uppermost metallic layer. Application of the cement and cover plate has in the past resulted in unpredictable changes in the wave length of peak transmission, in the value of maximum transmission of the filter, and in the half width of the transmission peak. Commonly the values of maximum transmission fall and the values of half width increase, constituting deterioration in the quality of the filters. In addition, any such changes of course constitute difficulties in the way of predictable and reproducible manufacture.

Microscopic examination of the layers of heretofore produced filters indicates that the difficulties are due to defects in the structure of the metallic and dielectric layers, especially of the intermediate layer of dielectric material and of the third metallic layer, which is the last to be laid down. The dielectric layer, when deposited on a cool surface of either glass or metal, commonly exhibits, after a short aging, a network of cracks averaging from 10 to 100 microns in length. Dielectric layers so deposited on glass or metallic surfaces at room temperature commonly have a flaky, polycrystalline structure of low resistance to abrasion and poorly bonded to the lower layer or supporting surface. Such dielectric layers are, moreover, strongly hygroscopic, so that the finished filter embodying such a dielectric layer, despite precautions to seal the layers against the atmosphere, readily absorbs enough moisture to develop gross cracks up to a quarter of an inch in length.

The imperfect mechanical structure of dielectric layers so deposited at room temperature is particularly prejudicial to the production of uniform interference filters of high quality because of its effect on the overlying metallic layer. With a flaky, cracked dielectric layer such as results from the evaporation of the dielectric material onto the first metallic layer while the latter is at room temperature, the outer metallic layer will likewise be lacking in compactness and uniformity. The cracks in the dielectric layer can readily be of such dimensions that the metal condensing thereon during the evaporation of the outer metallic layer will fail to bridge these cracks. The result is a filter showing marked scattering in a strong beam of light, reduced transmission and an opalescent surface even to the naked eye. When the protective cover is then cemented onto a filter so produced, serious changes in the maximum value of transmission and in the half width of the transmission peaks occur. These are believed to be due to a migration of the cement through the upper metallic layer whereby the thickness of the dielectric layer is effectively increased and the density of the upper metallic layer changed.

In order to produce a dielectric layer of superior mechanical and hence of superior optical properties, it is necessary to proceed with the deposition thereof upon a heated surface. We have discovered, however, that the entire process of filter manufacture should not be carried out with the successive layers or surfaces at an elevated temperature. The deposition of the first metallic layer on a heated surface results not in a smooth and homogeneous metallic layer, but in a metallic layer with a seeded surface which itself promotes the appearance of cracks in the dielectric layer to be laid down thereon.

We have discovered that if the first metallic layer is deposited upon the glass or other transparent support while the latter is at room temperature and the support and initial layer are thereafter heated so that the dielectric layer is deposited while the support and first layer are at an elevated temperature, the difficulties are largely overcome. By this process a first metallic layer is provided which serves as a good foundation and supporting layer for the deposition of a smooth, uniform and compact intermediate dielectric layer, while the dielectric layer so deposited upon a hot receiving surface is largely proof against cracking and in its turn serves as a good supporting layer for the outer metallic layer. Prior to the deposition of the outer metallic layer the support and the unfinished filter thereon should be allowed to return slowly to room temperature.

In accordance with the invention the vacuum chamber in which the deposition of the layers is carried out is provided with a filament by means of which the filter supports may be heated by radiant energy to the temperature most conducive to the production of dielectric layers having the desired properties. The layers may be controlled as to thickness by evaporating to completion from filaments placed in appropriate arrangement accurately weighed quantities of the materials to be deposited. Complete evaporation of the materials on the evaporating filaments may be insured by flashing the filaments to a very high temperature towards the close of the evaporation process. The evaporation of empirically determined quantities of material with a given arrangement of evaporating filaments and filter supports provides better control of the thickness and transparency of the layers deposited than the method of noting the transmission through or color of the light reflected from test glasses interposed between the source of the coating materials and the objects to be coated.

The invention will be better understood by reference to the following detailed description taken in conjunction with the accompanying drawings in which:

Fig. 2 is a partial elevation of the filter carrying fixture shown in Fig. 1;

Fig. 3 shows a highly magnified view of the appearance of a filter produced according to prior methods and exhibiting the defects which are overcome by the present invention;

Fig. 4 is a sectional view on the line 4—4 of Fig. 1 showing one of the evaporating filaments and crucibles used for the evaporation of the dielectric material.

Figure 1:
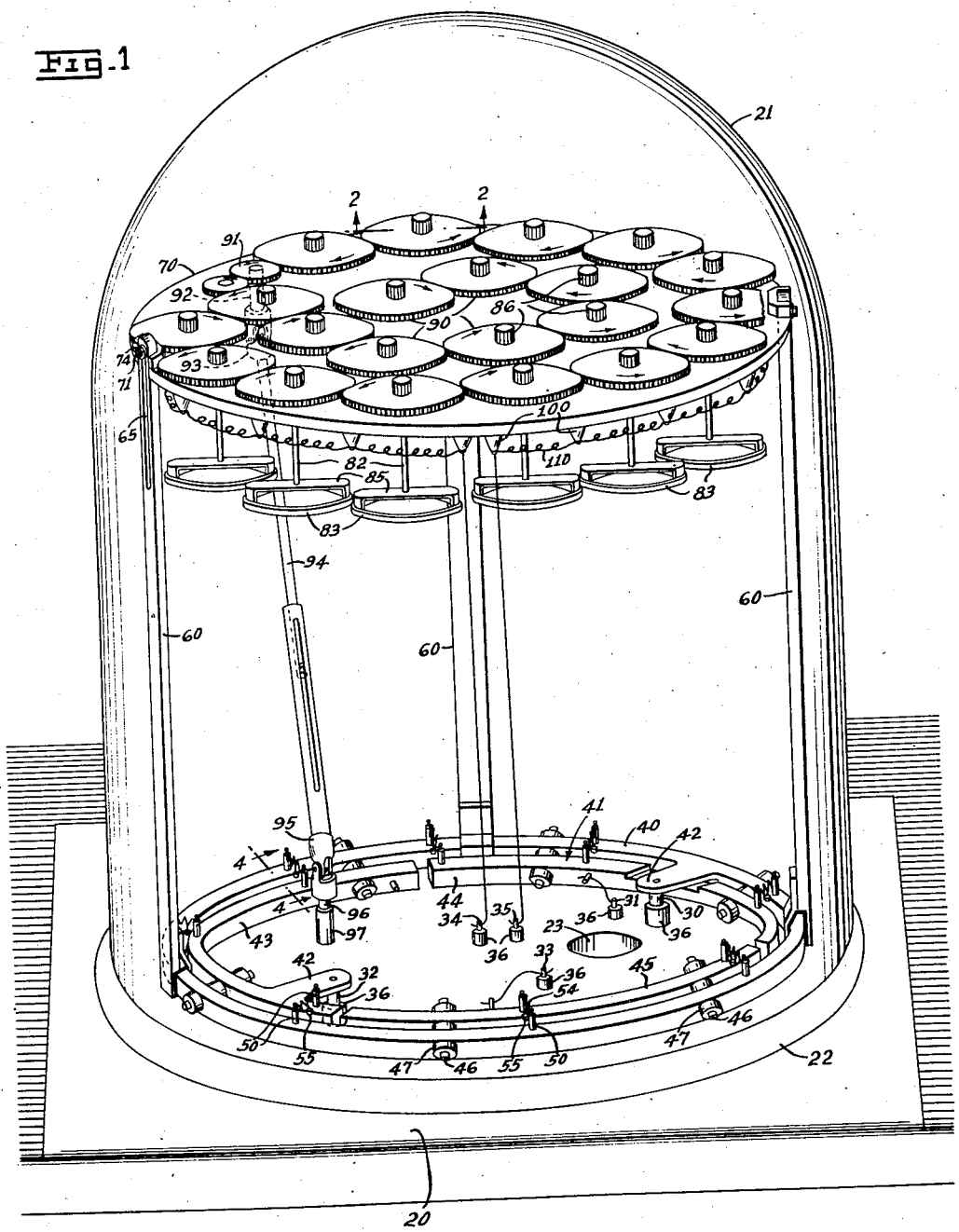
Fig. 1 shows a perspective view of an apparatus adapted to the practice of the invention.

Fig. 1 shows a perspective view of an apparatus adapted to the practice of the present invention. A smooth metal plate 20 forming the top of a pump table supports a bell jar 21 sealed to the metal plate by a rubber gasket 22 and within which the production of the filters takes place. The bell jar 21 is evacuated through the conduit 23 by means of suitable pumps (not shown) below the plate 20. The plate 20 is pierced by four electrodes 30, 31, 32 and 33 within the area covered by the bell jar and which are insulated from the plate 20 by means of insulating bushings 36. These electrodes serve to provide current to the evaporating filaments and also support the filters and the fixture in which they are carried during the process of manufacture. Two additional electrodes 34 and 35 provide current for the heating filament used to heat the filters during the deposition of the dielectric layers. The electrodes 30 and 32 are provided with shoulders at their upper ends on which may be rested either of the filament ring assemblies used in the evaporation of the materials to be deposited, and which support, in their turn, the filter carrying fixture and the heating system. In Fig. 1 is shown supported on the electrodes 30 and 32 the filament ring assembly used for the deposition of the dielectric layers. It comprises a pair of concentrically spaced copper rings 40 and 41 each of which is provided with an inwardly extending lug 42. These lugs are disposed at the ends of a diameter of the rings and are adapted to fit over the upper ends of the electrodes 30 and 32 and to rest thereon. The inner ring 41 is split into three equal sectors 43, 44 and 45 of approximately 120° which are spaced from each other by circumferential gaps. The sectors 43, 44 and 45 are assembled into a rigid structure with the ring 40 by means of studs 46 which pass through insulating bushings 47. The upper surface of the rings 40 and 41 is provided with eight pairs of binding posts 50 for connecting evaporating filaments 54 between the ring 40 and the ring 41, so that three such filaments may connect each of the sectors 43 and 44 with the ring 40 and two connect the sector 45 with the ring 40. The filaments 54 employed in evaporating the dielectric material are shown in detail in Fig. 4 and consist of tungsten wire formed into grids from which may be suspended molybdenum crucibles 55 containing pieces of the dielectric to be evaporated. The sectors 44 and 45 are connected by suitable leads and to the electrodes 31 and 33.

The filament ring assembly used in evaporating the metal layers is similar to that used for the deposition of the dielectric layers, except that the ring 41 is continuous so that all eight filaments will be energized at once upon applying a potential between the rings 40 and 41. The filaments employed for the evaporation of the metal consist of tungsten wire wound into the form of a helix into which the metal to be evaporated is placed.

The filter carrying fixture and the heating filament used to heat the filters during the deposition of the dielectric layer are supported above the filament ring assembly by upright standards 60 which rest on the filament ring assembly. The lower ends of the standards 60 are slotted and carry insulating inserts which fit snugly over the ring 40. The upper portions of the standards 60 are provided with lengthwise slots 65 so as to make adjustable the separation of the filter carrying fixture supported by the standards from the evaporating filaments on the filament ring assembly below. The filter carrying fixture, of which a partial elevation appears in Fig. 2, comprises a circular plate 70 having approximately the same diameter as the outer filament ring 40. It is provided with studs 71 extending radially outward from its circumference and adapted to pass through the slots 65 of the standards 60. By means of nuts 74 the plate 70 may be fastened at any height along the length of the slots 65. The plate 70 is drilled to provide bearings through which pass rotating shafts 81. The shafts 81 are hollow and accommodate inner shafts 82 from which are suspended the individual filter holders 83. The filter holders 83 consist of metallic rings having a recess of diameter equal to the diagonal length of the filter supports on which the interference layers are to be deposited. A hanger 85 is brazed to each ring at diametrically opposite points and fastens to an inner shaft 82. The inner shaft 82 may be inserted through a shaft 81 and prevented from falling out by a thumb nut 86. The shafts 81 and 82 and the filter holders 83 may be rotated at a common rate by means of a gear train provided on the upper surface of the plate 70. Each of the shafts 81 is provided at its upper end with a gear 90 and the gears are so disposed that each gear meshes with an adjacent gear. Near the edge of the plate 70 is mounted a pinion 91 on a shaft 92 passing through the plate 70 and to which power may be applied through a universal joint 93, an extensible shaft 94, a second universal joint 95 and a shaft 96 extending through a vacuum-tight bushing 97 in the plate 20 to a power source (not shown) below the plate 20.

The lower side of the plate 70 is provided with a number of stand-off insulators 100. A heating filament 110 for the heating of the filters during the deposition of the dielectric layer is arrayed under the plate 70 in a plane substantially parallel to that of the filters in the filter holders 83 by stretching from the insulators 100. The ends of the filament 110 are connected by suitable leads to the electrodes 34 and 35 which lead on the underside of the plate 20 to the terminals of the secondary winding of a suitable variable transformer (not shown). The electrode 30 contacting the outer ring 40 of the filament ring assembly through a lug 42 leads below the plate 20 to one terminal of the secondary winding of a similar variable transformer (not shown), and the electrodes 31, 32 and 33 may be alternately connected through a selector switch to the other terminal of that secondary winding.

Fig. 3 is an enlarged drawing of a microscopic view of the surface of a filter wherein the magnesium fluoride dielectric layer was deposited while the glass support and first silver layer were at room temperature. It illustrates the shortcoming of filters produced according to previous methods and which is overcome by our invention. A regular network of cracks is observed, the length of the cracks averaging from 5 to 10 microns between intersections. Such filters show marked scattering and cloudiness in oblique light and have a correspondingly reduced transmission.

In the practice of the invention it has been found that the difficulty of producing a dielectric layer of uniform thickness on all of the filters is best overcome by evaporating the dielectric from eight filaments arranged in a circle separated from the plane of the filters by a distance equal to the diameter of this circle. By using a substantial number of filaments arranged in a circle and by relating the separation of the filters from this circle as above indicated, the variation in thickness of the deposited layers is minimized within a single filter and among the filters of a batch.

The optimum temperature of the glass support and first metallic layer for the reception of the dielectric layer has been found to lie between 110° and 140° C.

The following example illustrates the practice of the present invention.

A number of squares of pitch-polished mirror plate glass sufficient to fill the rotating holders of the fixture of Fig. 1 were carefully cleaned by swabbing with distilled acetone, scrubbing with a calcium carbonate paste followed by scrubbing with a diluted solution of a commercial wetting agent and finally by rinsing with hot distilled water-free acetone.

These filter supports were then mounted, clean side down, in the rotating filter holders of the filter carrying fixture and introduced into the vacuum chamber with as little delay as possible. The height of the fixture was adjusted so that the filter supports lay in a plane some 7½ inches above the plane of the evaporating filaments which were disposed in a circle some 15 inches in diameter. The heating filament used to heat the unfinished filters during the deposition of the dielectric layer was disposed in a plane parallel to the plane of the filter supports approximately ¾ of an inch above them.

For the deposition of the metallic layers the filament ring assembly embodying an integral internal ring was used so that all evaporating filaments were energized at once. Each of eight evaporating filaments formed of a helical spiral of tungsten wire and making contact with the two electrical heating rings was loaded with exactly 59 milligrams of chemically pure silver wire. The bell jar was then lowered and sealed onto the pumping table and the resulting chamber was evacuated to a pressure of approximately $5 \times 10^{-5}$ millimeters of mercury.

The filter holders were then set into rotation at a rate of six revolutions per minute by means of the drive shaft passing through the pump table and the 8 tungsten filaments bearing the silver to be evaporated were brought up over a period of one minute to the melting point of silver. The temperature of the filaments was then raised until evaporation of the silver was evident and the silver was evaporated to completion over a period of approximately two minutes, the end of the process being observed from the disappearance of dark spots on the filaments.

The vacuum was then broken and the pressure in the vacuum chamber was allowed to rise slowly over a period of approximately three minutes to atmospheric in order to minimize the accumulation of dirt on the filters from the admitted air. The bell jar was then removed and two of the filter supports bearing a silver layer were removed from the fixture and their transmission for the light from a tungsten filament was measured. Transmission values between 5% and 15% indicated satisfactory completion of the evaporation of the first silver layer and the two filter supports were returned to the fixture.

For the evaporation of the transparent layer of metallic fluoride the filament ring assembly of Fig. 1, permitting successive evaporation from three groups of filaments, was substituted for the simple filament ring assembly used in evaporating the silver so that the same advantageous use of a large number of filaments properly spaced apart could be retained without generating the excessive heat which would be produced by the simultaneous operation of eight filaments at a temperature high enough to evaporate magnesium fluoride.

In order to produce a batch of filters with second order transmission peaks in the vicinity of 500 millimicrons, each filament was loaded with 100 milligrams of magnesium fluoride. The magnesium fluoride had been previously purified by sintering under a pressure of $10^{-4}$ millimeters of mercury in order to dry and out-gas it. This step is important in order to prevent spattering of the magnesium fluoride during the evaporation process.

After replacement of the filter carrying fixture, the bell jar was again lowered and the chamber was exhausted as before to $5 \times 10^{-5}$ millimeters of mercury. The filter holders were set in rotation and the heating filament strung above the filter supports from insulators on the underside of the filter carrying fixture was then energized so as to raise the temperature of the filter supports over a period of 25 minutes to a temperature of approximately 125° C. One group of three evaporating filaments was then slowly brought up to white heat over a period of five minutes by energizing one of the sectors of the inner filament ring with respect to the outer ring. When the proper temperature was reached, the magnesium fluoride in the crucibles under these three filaments melted down, whereupon the temperature of these filaments was raised so as to evaporate approximately one-half the magnesium fluoride thereunder over a period of three minutes. The first group of evaporating filaments was then allowed to cool, while the next group was slowly brought up to temperature and the filaments on the other two sectors of the heating rings were successively put through the same cycle. The process was then repeated for all three groups of filaments so as to evaporate to completion all of the magnesium fluoride present. After the evaporation of the magnesium fluoride was complete, the heating filament was deenergized and the unfinished filters were allowed to cool for 25 minutes.

The vacuum was then broken and the pressure slowly raised over a period of five minutes until the bell jar could be lifted and the filter carrying fixture and filament ring assembly removed from the table. The filament ring assembly with an integral inner ring 41 was then replaced on the supporting electrodes 30 and 32 for the deposition of the second silver layer, each of the eight filaments being loaded as before with 59 milligrams of chemically pure silver. The second silver layer was then deposited by the same procedure as the first. After the evaporation of the second silver layer was complete, the pressure within the bell jar was returned to atmospheric over a period of some 25 minutes, after which the filters could be removed from the holders.

The filters were then visually inspected for defects and their spectral transmission curves were taken by means of a grating spectrophotometer to eliminate any exhibiting inadequate transmissions. The filters not rejected were then cemented with a properly chosen blocking filter of the absorption type so as to protect the interference layers from the atmosphere and to remove transmission peaks of undesired orders.

The blocking filters were cemented to the interference filter with a self-polymerizing cement according to the usual techniques used in the cementing of lenses.

The filters so produced did not develop the cloudy appearance and reduced transmission characteristically apparent in filters produced by prior techniques after the cementing operation.

While we have described our invention with reference to one type of apparatus suitable to the practice thereof, it is to be understood that the invention is not limited to the details thereof but that various modifications may be made both in procedure and in the apparatus used within the scope of the appended claims.

We claim:

1. In the manufacture of optical filters having predetermined transmission characteristics and comprising a smooth surfaced transparent support bearing two discrete semi-transparent metallic layers separated by a continuous substantially transparent layer of a metallic fluoride having a uniform optical thickness substantially equal to a small odd number of quarter wave lengths for light of a wave length to be transmitted by the filter, the method comprising the steps of depositing by evaporation in a vacuum chamber a first semi-transparent metallic layer on said support while said support is at substantially room temperature, heating said support and said first metallic layer in the said vacuum chamber to a temperature substantially within the range of 110° to 140° C., depositing by evaporation in said vacuum chamber upon said first metallic layer while so heated a substantially continuous layer of a metallic fluoride having an optical thickness substantially equal to a small odd number of quarter wave lengths for light of a wave length to be transmitted by the filter, allowing said support and the layers thereon to return to room temperature in said vacuum chamber, and depositing by evaporation in said vacuum chamber on said layer of metallic fluoride an outer semi-transparent metallic layer while said support and the layers thereon are at substantially room temperature.

2. In the manufacture of optical transmission filters having predetermined transmission characteristics and comprising a smooth surfaced transparent support bearing two discrete metallic layers each having a uniform transmission for white light not substantially less than 5% nor more than 15% and separated by a continuous substantially transparent layer of a metallic fluoride having a uniform optical thickness substantially equal to a small odd number of quarter wave lengths for light of a wave length to be transmitted by the filter, the method comprising the steps of depositing upon said support while at room temperature a first semi-transparent metallic layer by the evaporation in a vacuum chamber of a previously weighed quantity of metal sufficient to produce a layer having a transmission substantially between 5% and 15% for white light, heating said support and said first metallic layer to a temperature between substantially 110° and 140° C., depositing upon said first metallic layer while so heated a substantially transparent continuous layer of a metallic fluoride by the evaporation in a vacuum chamber of a previously weighed quantity of said metallic fluoride sufficient to produce a layer thereof having a uniform optical thickness substantially equal to a small odd number of quarter wave lengths for light of a wave length to be transmitted by the filter, allowing said support and the layers deposited thereon to return gradually to room temperature, and depositing upon said layer of metallic fluoride while at room temperature a second semi-transparent metallic layer by the evaporation in a vacuum chamber of a previously weighed quantity of a metal sufficient to produce a layer having a transmission between substantially 5% and 15% for white light.

3. In the manufacture of optical transmission filters operating by light ray interference and absorption and comprising a clear glass plate bearing two semi-transparent layers of silver separated by an intermediate layer of a metallic fluoride, the method comprising the steps of depositing by evaporation under reduced pressure within a vacuum chamber a semi-transparent substantially continuous layer of silver on a surface of said plate while said plate is at a temperature within the range of substantially 20° to 30° C., thereafter heating said plate and the layer of silver thereon to a temperature within the range of substantially 110° to 140° C. by radiant energy within said vacuum chamber, depositing upon said layer of silver by evaporation within said vacuum chamber and while said plate and layer are so heated a layer of a metallic fluoride having a uniform optical thickness substantially equal to a small odd number of quarter wave lengths for light of a wave length to be transmitted by the filter, gradually lowering the temperature of said plate and the layers thereon in said chamber to substantially the said initial temperature of the plate at which the said layer of silver was deposited, and depositing by evaporation within said vacuum chamber a second semi-transparent substantially continuous layer of silver on said layer of a metallic fluoride.

4. The method of manufacturing optical transmission filters operating by light ray interference and absorption and comprised of a smooth surfaced support bearing two semi-transparent silver layers separated by an intermediate layer of a metallic fluoride and having transmission maxima at pre-selected wave lengths which comprises depositing upon said support while said support is at room temperature a first silver layer by the evaporation in a vacuum of a weighed quantity of silver sufficient to produce on said support a continuous silver layer of uniform thickness having a transmission for white light not substantially less than 5% and not substantially more than 15%, slowly heating said support and said first silver layer to a temperature within the range of substantially 110° to 140° C., depositing upon said first silver layer while said support and said first silver layer are at a temperature within the range of substantially 110° to 140° C. a continuous transparent layer of a metallic fluoride by the evaporation in a vacuum of a weighed quantity of said metallic fluoride sufficient to produce on said first silver layer a discrete continuous layer of said metallic fluoride having a uniform optical thickness substantially equal to a small odd number of quarter wave lengths for one of said pre-selected wave lengths of maximum transmission, allowing said support and the layers thereon to return gradually to room temperature, and depositing on said layer of metallic fluoride a second continuous layer of silver by the evaporation in a vacuum of a weighed quantity of silver sufficient to produce a continuous layer of silver having a transmission for white light not substantially less than 5% and not substantially more than 15%.

5. In the manufacture of optical transmission filters operating by light ray interference and absorption and consisting of a plurality of discrete semi-transparent metallic layers alternated with discrete transparent layers of a metallic fluoride having an optical thickness substantially equal to a small odd number of quarter wave lengths for light of a wave length to be transmitted by the filter, the process which consists in depositing the semi-transparent metallic layers by evaporation in a vacuum while the surfaces receiving the same are at room temperature, and depositing the metallic fluoride layers by evaporation in a vacuum while the surfaces receiving the same are at a temperature substantially within the range of 110° to 140° C.

6. In the manufacture of optical filters having predetermined transmission characteristics and comprising a smooth surfaced support bearing two discrete semi-transparent metallic layers separated by a continuous layer of a metallic fluoride having a uniform optical thickness substantially equal to a small odd number of quarter wave lengths for light of a wave length to be transmitted by the filter, the method comprising the steps of depositing by evaporation in a vacuum chamber a first semi-transparent metallic layer on said support while said support is at substantially room temperature, heating said support and said first metallic layer in the said vacuum chamber to a temperature substantially within the range of 110° to 140° C., depositing by evaporation in said vacuum chamber upon said first metallic layer while so heated a continuous layer of a metallic fluoride having an optical thickness substantially equal to a small odd number of quarter wave lengths for light of a wave length to be transmitted by the filter, allowing said support and the layers thereon to return to room temperature in said vacuum chamber, and depositing by evaporation in said vacuum chamber on said layer of metallic fluoride an outer semi-transparent metallic layer while said support and the layers thereon are at substantially room temperature.

7. In the manufacture of optical transmission filters operating by light ray interference and absorption and comprising a plurality of semi-transparent metallic layers alternated with layers of a metallic fluoride of index of refraction substantially different from the index of refraction of said metallic layers, the process which consists in depositing the semi-transparent metallic layers by evaporation in a vacuum while the surfaces receiving the same are at room temperature and depositing the layers of said metallic fluoride by evaporation in a vacuum while the surfaces receiving the same are at a temperature substantially within the range of 110° to 140° C.

8. In the manufacture of optical filters embodying a transparent support bearing a plurality of semi-transparent metallic layers each of which is spaced from the adjacent metallic layers by layers of a metallic fluoride having an index of refraction substantially different from that of the metal, the process of depositing said metallic layers by evaporation in a vacuum while said support is at room temperature, and depositing said spacing layers while said support is at a temperature substantially within the range of 110° to 140° C.

MEYER H. AXLER.
KENNETH F. TRIPP.

REFERENCES CITED

The following references are of record in the file of this patent:

UNITED STATES PATENTS

| Number | Name | Date |
| --- | --- | --- |
| 2,151,457 | Williams | Mar. 21, 1939 |
| 2,301,456 | Sabine | Nov. 10, 1942 |
| 2,332,309 | Drummond | Oct. 19, 1943 |
| 2,344,138 | Drummond | Mar. 14, 1944 |
| 2,373,823 | Gold | Apr. 17, 1945 |
| 2,386,875 | Morgan | Oct. 16, 1945 |
| 2,398,382 | Lyon | Apr. 16, 1946 |
| 2,411,715 | Dimmick | Nov. 26, 1946 |

FOREIGN PATENTS

| Number | Country | Date |
| --- | --- | --- |
| 716,153 | Germany | Jan. 14, 1942 |

OTHER REFERENCES

Strong, Procedures in Experimental Physics, published 1938 by Prentice Hall, pages 182, 183.